United States Patent
Freitag

(10) Patent No.: US 6,516,287 B1
(45) Date of Patent: Feb. 4, 2003

(54) METHOD AND DEVICE FOR SIMULATING THE MASS OF MOTOR VEHICLES PLACED ON STATIONARY TEST STANDS

(75) Inventor: Gernot Freitag, Darmstadt (DE)

(73) Assignee: Schenck Pegasus GmbH, Darmstadt (DE)

( * ) Notice: Subject to any disclaimer, the term of this patent is extended or adjusted under 35 U.S.C. 154(b) by 0 days.

(21) Appl. No.: 09/807,163

(22) PCT Filed: Oct. 8, 1999

(86) PCT No.: PCT/EP99/07576

§ 371 (c)(1),
(2), (4) Date: Apr. 9, 2001

(87) PCT Pub. No.: WO00/22405

PCT Pub. Date: Apr. 20, 2000

(30) Foreign Application Priority Data

Oct. 9, 1998 (DE) .......................................... 198 46 612

(51) Int. Cl.⁷ .......................... G01L 3/22; G01M 17/007
(52) U.S. Cl. .......................... 702/173; 702/175; 701/29; 73/862.09; 73/117
(58) Field of Search .................... 702/173, 174, 702/175; 701/29; 703/8; 73/116, 117, 862.09

(56) References Cited

U.S. PATENT DOCUMENTS

| | | | |
|---|---|---|---|
| 4,621,524 A | 11/1986 | von Thun | |
| 4,656,576 A | 4/1987 | Kawarabayashi | |
| 4,745,799 A | 5/1988 | Kawarabayashi et al. | |
| 5,445,013 A | 8/1995 | Clayton, Jr. et al. | |
| 5,452,605 A | * 9/1995 | Wilson et al. | 73/117 |
| 5,465,612 A | 11/1995 | La Belle | |
| 5,542,290 A | * 8/1996 | Suzuki | 73/117 |
| 5,657,227 A | 8/1997 | Freitag | |
| 6,247,357 B1 | * 6/2001 | Clayton et al. | 73/117 |
| 6,360,591 B1 | * 3/2002 | Carley | 73/117 |

FOREIGN PATENT DOCUMENTS

| | | |
|---|---|---|
| DE | 2738325 | 3/1978 |
| DE | 3347182 | 12/1983 |
| DE | 3920277 | 1/1991 |
| DE | 4427966 | 2/1996 |
| DE | 19730851 | 2/1998 |
| EP | 0522198 | 1/1993 |
| EP | 0696729 | 2/1996 |
| EP | 09905875 | * 8/1998 |
| JP | 07063657 | 3/1995 |

OTHER PUBLICATIONS

Hochgeschwindigkeits–Personen-wagen–Trommelpruefstand mit digitalem Fahrsimilator; MIRUS et al.; ATZ –Automobiltechnische Zeitschrift 86; 1984, 11, pp. 495, 496, 501, 502.

* cited by examiner

Primary Examiner—Kamini Shah
(74) Attorney, Agent, or Firm—W. F. Fasse; W. G. Fasse

(57) ABSTRACT

The invention relates to a method and an apparatus for the mass simulation of vehicle masses on a stationary roller test stand, wherein the simulation mass ($m_{sim}$) is determined from the test stand mass ($m_P$) and from the mass ($m¿Rad h?$) of the non-driven rotatable vehicle parts that are determined by measuring techniques, as well as from the mass ($m¿Rad h?$) of the driven rotatable vehicle parts that are determined by measuring techniques, and with the aid of the translatory vehicle mass ($m_F$), in an evaluating device (10) of the test stand.

9 Claims, 1 Drawing Sheet

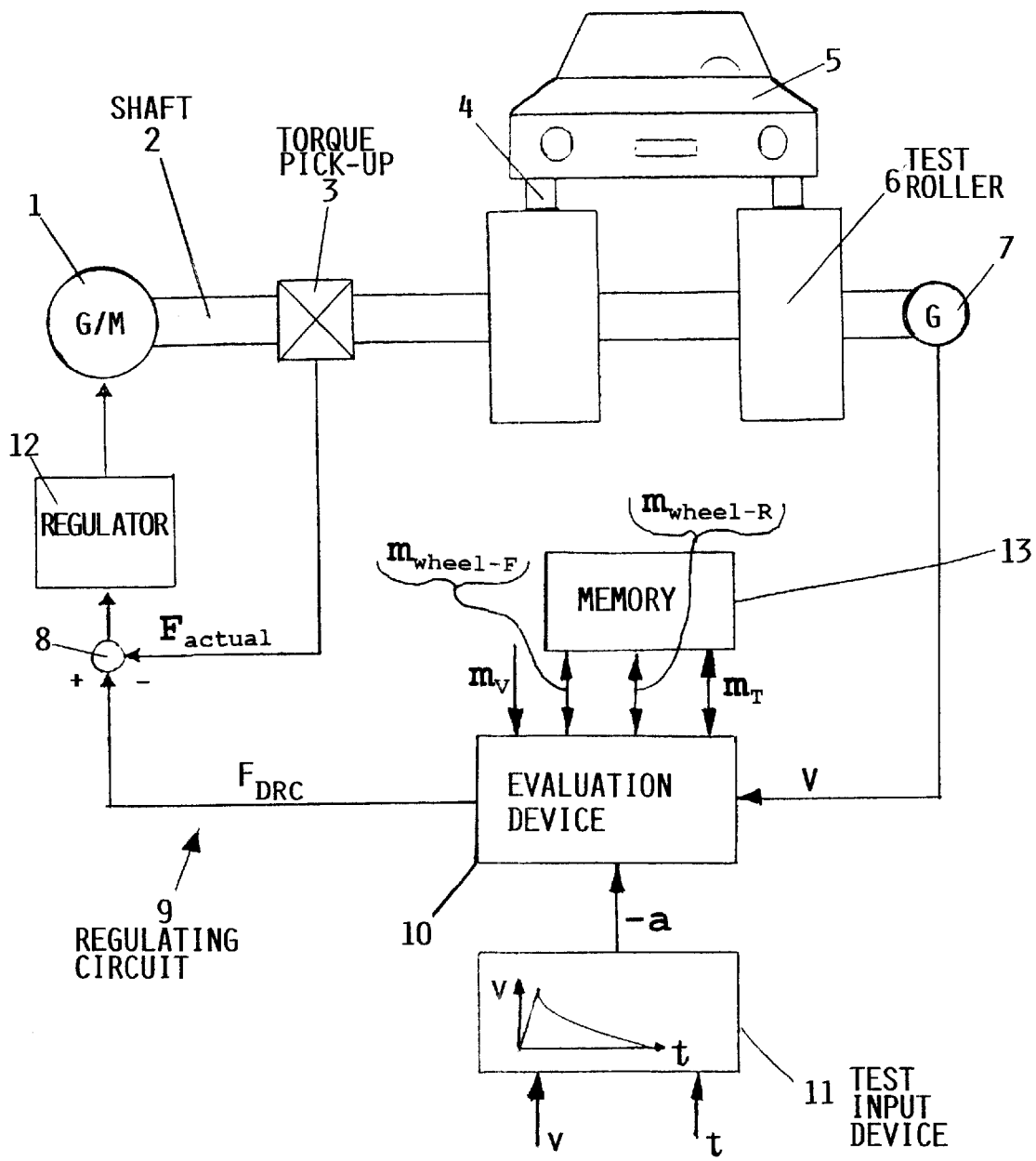

METHOD AND DEVICE FOR SIMULATING THE MASS OF MOTOR VEHICLES PLACED ON STATIONARY TEST STANDS

The invention relates to a method for mass simulation of motor vehicles on stationary test stands according to the preamble of the patent claim 1 as well as an apparatus for carrying out this method according to the preamble of the patent claim 5.

For stationary vehicle testing, roller test stands are predominantly used as stationary test stands. In this context, the drive wheels of a motor vehicle are coupled with the rollers of the test stand with respect to the rotational moment or torque. Since the vehicles do not move on these test stands, the inertial forces resulting from the acceleration of the vehicle mass must be simulated by the test stand, if the mass inertial moment of the test stand does not correspond with that of the vehicle mass. Hereby it is typical to simulate the difference of the inertial forces through a loading moment, which is generated, for example, by means of a direct current machine. The magnitude of the loading moment is regulated by a dynamic regulating circuit or closed control loop dependent on the respective acceleration.

For example, in order to exactly determine the exhaust gas properties of a vehicle determined on such test stands, the automobile industry and the environmental agencies place high demands on the measuring accuracy of such roller test stands. Therefore, all of the masses of the vehicle must be taken into consideration, which are not accelerated while driving on the test stand in comparison to driving on the street. These are, on the one hand, the translatory masses of the vehicle, such as the weight as well as the rotatable parts of the non-driven axles on the test stand.

In practice, these rotatable still-standing or non-moving masses were previously not exactly determined, but instead were approximately estimated based on empirical values. This was carried out because, although the weight of a vehicle is simple to determine, however it is not simple to determine the inertial moments of the rotating parts such as the wheels including the drive train, the clutch, the transmission and the like. Such a mass determination of these parts has previously been made more difficult, because frictional losses always additionally arise for these rotatable vehicle parts. For this reason, the sought-after inertia values have been approximately determined from the weight of the vehicle. Thus, from the vehicle weight, an increase or add-on of 3% to be added to the vehicle mass has been assumed for the rotatable vehicle parts. For a test stand run, that meant an increase or add-on of 1.5% onto the vehicle mass per non-rotating vehicle axle.

Such an estimation of the rotatable vehicle masses, which are not accelerated during the testing process on the test stand, can lead to an error of the mass simulation in unfavorable cases, whereby this error by itself already exceeds the required total measuring accuracy. Especially, this leads to considerable errors in the mass simulation if the distribution of the rotating inertias on the driven and non-driven axles is non-uniform.

Therefore, the invention is based on the object of improving the accuracy of the mass simulation on vehicle test stands.

This object has been achieved by the invention defined in the patent claims 1 and 5. Further developments and advantageous example embodiments of the invention are defined in the dependent claims.

The invention has the advantage that essentially all rotatable vehicle masses can be exactly determined by a measurement, and thereby consequent errors in the calculation of the driving resistances as well as of the mass simulation are avoidable.

The invention is described in further detail in connection with an example embodiment, which is illustrated in the drawing. The drawing shows a schematic illustration of a roller test stand with a regulating circuit or closed control loop 9, which contains an evaluation device 10 with a memory circuit 13 and a test input device 11, a junction point 8 and a regulator 12, and which regulates the direct current machine 1 corresponding to the vehicle mass that is to be simulated.

In the drawing, a direct current machine 1 is illustrated, which is rotatably connected with two testing stand rollers 6 via a connecting shaft 2. A vehicle 5 is schematically illustrated on the two test stand rollers 6, whereby the vehicle 5 is connected with one axle and the two vehicle wheels 4 in a force transmitting manner with the test stand rollers 6. Furthermore, the test stand rollers 6 are connected via the same shaft 2 with a rotational speed detection device, which is embodied as a tacho-generator 7. A rotational moment or torque pick-up 3, which is electrically connected with the regulating circuit 9, is arranged on the connecting shaft 2 between the direct current machine 1 and the test stand rollers 6 positioned opposite thereto. Thereby, the regulating circuit 9 consists of an evaluating device 10, onto which a memory circuit 13 and a test input device 11 are connected, a regulator 12 and a junction point 8. The tacho-generator 7 is connected with the evaluating device 10 on the input side. Furthermore, the junction point 8 is arranged between the regulator 12, the force pick-up 3, and the output of the evaluating device 10 and establishes an electrical connection therebetween. The regulator 12 provides a regulating signal via its output to the direct current machine 1. The direct current machine 1 can be operated both as a generator as well as a motor.

The test input device 11 connected with the evaluating device 10 contains two inputs for inputting a vehicle velocity v and the associated time t, and an output which supplies to the evaluating device 10 the delay $-a$ determined from the inputs. The evaluating device 10 contains another input for inputting the translatory vehicle mass $m_F$, which is inputtable as a previously known value. Moreover, the evaluating device 10 is still further connected with a memory circuit 13, which stores the test results determined on the test stand, such as the test stand mass $m_P$, the mass of the rotatable vehicle drive masses $m_{Rad\,h}$ on the rear axle and the mass of the remaining rotatable vehicle mass $m_{Rad\,v}$ on the non-driven front axle.

The above described apparatus operates according to the following method steps: In the testing of a vehicle 5 on a roller test stand, the drive axle of the vehicle 5 as the test sample drives, via its vehicle wheels 4, the test stand rollers 6. On the other hand, the test stand rollers 6 can also be driven via the direct current machine 1. This is carried out preferably when the non-driven wheels 4 of a vehicle axle are located on the test stand rollers 6. Thereby, the tacho-generator 7 and the direct current machine 1 are simultaneously moved along via the connecting shaft 2. Thereby the tacho-generator 7 generates a signal, which is proportional to the velocity v or the angular velocity $\omega$. In the above described known differentiating evaluating method, the accelerating vehicle force which acts on the test stand rollers 6 can be derived from the angular velocity signal $\omega$. On the other hand, during the motor operation of the direct current machine 1, the force effect expended for the acceleration of the rotatable vehicle masses can also be determined by the differentiation of the velocity signal v or ω. Therefrom, by means of the evaluating device 10, the corresponding mass values such as the test stand mass $m_P$, the mass $m_{Rrad\ h}$ rotating with the drive axle, the mass $m_{Rad\ v}$ that is rotatable with the non-driven front axle, are calculable.

For the simulation of all of the vehicle masses that are effective on the street, first all of these individual masses must be determined or calculated, in order to then determine their effect by means of a roll-out test on the street. Then, from these measurement results, a driving resistance characteristic curve or corresponding values can be fixed or determined, which serve for the simulation of the determined vehicle masses.

The invention was based on the recognition that the accuracy of the mass simulation can be considerably improved, if the vehicle total mass $m_{gesamt}$ is measurably determined, because this mass $m_{gesamt}$ ultimately is effective during street driving, and the exact knowledge of which is necessary for the evaluation of the roll-out tests and determination of the driving resistance characteristic curve. In this context, the total mass $m_{gesamt}$ of the vehicle 5 effective on the street is calculated to:

$$m_{gesamt} = m_F m_{Rad\ v} + m_{Rad\ h}$$

Therein the symbols mean:
$m_F$=vehicle mass;
$m_{Rad\ v}$=the rotatable mass of the front axle;
$m_{Rad\ h}$=the rotatable mass of the rear axle.

The vehicle mass $m_{F\ sim}$ for the determination that is to be assumed for the simulation by the test stand results in that the drive parts (for example the rear drive $m_{Rad\ h}$) that are already rotating along on the roller test stand are subtracted from the total mass $m_{gesamt}$. From that follows the mathematical correlation:

$$m_{Fsim} = m_{gesamt} - m_{Rad\ h} = m_F + m_{Rad\ v}$$

Since the translatory vehicle mass $m_F$ is generally known as the weight, the rotatable vehicle masses of the non-accelerated vehicle parts must be determined by measuring techniques on the test stand. To achieve this, first the test stand mass $m_p$ without the vehicle is determined with the aid of the recording of the loss characteristic curve and is stored in the memory circuit 13. Next, the testing vehicle 5 is first placed onto the test stand roller 6 with the one vehicle axle, for example the non-driven front axle, and then in the testing operation the loss recording and the mass determination are carried out. From this value, first the difference relative to the previously determined test stand mass $m_p$ is formed, so that the sought-after mass $m_{Rad\ v}$ and the losses $F_{V\ Rad\ v}$ are given therefrom for the preceding loss recording of the test stand rollers 6 without a vehicle. These values are transmitted into the memory circuit 13 and are there available for further interrogation or reading-out.

Thereafter, the vehicle 5 is placed with its drive wheels 4 of the rear axle onto the test stand rollers 6, and is subjected to a renewed testing process with a loss recording and mass determination. In this context once again, in the evaluating device 10, the difference relative to the preceding loss recording of the test stand rollers 6 without a vehicle 5 is formed, so that the sought-after mass $m_{Rad\ h}$ and the losses $F_{V\ Rad\ h}$ are given therefrom. These values are once again loaded into the memory circuit 13 and there remain available for further calculations.

From the preceding testing processes, all of the measured values are available to the evaluating device 10, which are necessary for the calculation of the total mass $m_{gesamt}$, so that this may be calculated and stored into the memory circuit 13.

Likewise, from the available measured values, the vehicle mass $m_{F\ sim}$ that is to be simulated is calculable according to the formula:

$$m_{F\ sim} = m_{gesamt} - m_{Rad\ h} = m_F + m_{Rad\ v}.$$

In order to be able to simulate a velocity dependent driving cycle it is further necessary to record a driving resistance characteristic curve FWK, which is determined by means of roll-out tests or experiments on the street. Such a roll-out test can also be carried out on the test stand before the vehicle testing, which in practice is generally the case.

In such a roll-out test or experiment, the test vehicle 5 is accelerated to a prescribed velocity or speed v on the street and then for its roll-out distance without drive, the velocity variation (Δv) per time unit (Δt) is determined. In this context, the velocity values v are sampled at certain time spacings or intervals t, and provided to the test input device 11. From these values, the test input device 11 calculates the roll-out characteristic −a over a prescribed velocity range, which corresponds to the real or actual driving resistance characteristic progression on the street. The determined roll-out characteristic −a of the vehicle 5 is provided to the evaluating device 10. According to the mathematical interrelation, $$F_{FWK} = -m_{gesamt} \cdot \frac{\Delta v}{\Delta t},$$

the forces $F_{FWK}$ that are to be formed or determined are calculated from the available measuring results over the velocity by the evaluating device 10, which forces are prescribed as a nominal value to the regulating circuit 9 for controlling a prescribed driving path or distance simulation. From this, the difference force is determined, with the aid of the actual value $F_{ist}$ that is determined by the force pick-up 3, whereby this difference force is regulated-out or compensated by the regulator 12 for the mass simulation.

With the invention it is also possible to correct existing vehicle resistance characteristic curves that have been determined by means of roll-out tests and estimated inertias for the remaining rotatable vehicle masses. For this purpose, it is simply necessary to input values of the error-affected vehicle resistance characteristic curve rather than the input values of the test input device 11 into the evaluating device 10, and these error-affected values are set into a ratio with the values of the total mass $m_{gesamt}$ that have been determined by measuring techniques, according to the formula:

$$F_{FWK} = \frac{m_{gesamt}}{m_{geschätzt}} \times \frac{\Delta v}{\Delta t} \times m_{geschätzt} = \frac{m_{gesamt}}{m_{geschätzt}} \times F_{FWKgeschätzt}$$

Thereby, the error-affected resistance characteristic curve FWK is corrected corresponding to the actual ratio by means of the evaluating device 10.

The above described evaluating device 10, memory circuit 13 and test input device 11 may also be integrated into the electrical test stand control, or be embodied as a program-controlled computer unit.

What is claimed is:
1. Method for the mass simulation of vehicle masses on stationary test stands, especially on vehicle roller test stands, whereby the simulation mass is determined from the vehicle masses rotating along on the test stand and the remaining vehicle masses, characterized in that a separate testing process is carried out on the test stand for the remaining rotatable vehicle parts, and the vehicle total mass ($m_{total}$), which serves for the determination of the simulation mass ($m_{V\text{-}sim}$), is determined from the measured values ($m_{wheel\text{-}F}$) of the separate testing process and with the aid of the translatory vehicle mass ($m_V$) as well as the vehicle masses ($m_{wheel\text{-}R}$) rotating along during the testing process.

2. Method for the mass simulation according to patent claim 1, characterized in that first the test stand mass ($m_T$) without a vehicle (5) is determined, and the rotatable vehicle masses ($m_{wheel\text{-}F}$) of the non-driven vehicle parts are measured in a separate test process, and in a further test process the vehicle masses ($m_{wheel\text{-}R}$) of the driven rotatable vehicle parts are measured, from which, with the aid of the prescribed translatory vehicle mass ($m_V$), the vehicle total mass ($m_{total}$) is determined.

3. Method for the mass simulation according to claim 1, characterized in that a driving resistance characteristic curve (DRC) is calculated for the vehicle (5) to be tested, from the determined vehicle total mass ($m_{total}$) and from the velocity variations ($\Delta v$) per time unit ($\Delta t$) determined in a roll-out test of the motor vehicle (5), whereby the simulation mass ($m_{V\text{-}sim}$) is determined with the aid of the driving resistance characteristic curve (DRC).

4. Method for the mass simulation according to claim 1, characterized in that a driving resistance characteristic curve (DRC), which was determined by means of estimated mass ($m_{estimated}$) of the non-accelerated rotatable vehicle parts, is set into a ratio with the measured mass ($m_{total}$) of the non-accelerated vehicle parts, and from that, corrected driving resistance values ($F_{DRC}$) or a corrected driving resistance characteristic curve (DRC) is determined, which serves for the determination of the simulation mass ($m_{V\text{-}sim}$).

5. Apparatus for carrying out the method according to claim 1, characterized in that the regulating circuit (9) of a stationary test stand contains an evaluating device (10) with a memory circuit (13), which are so embodied, so that in a testing process without vehicle loading, the test stand mass ($m_T$) or the test stand losses ($F_{IT}$) are determined by means of the evaluating device (10) and stored in the memory circuit (13), as well as in a further testing process the rotatable non-driven vehicle masses ($m_{wheel\text{-}F}$) and in a further separate testing process C the driven rotatable vehicle masses ($m_{wheel\text{-}R}$) are determined by means of a measuring process by the evaluating device (10) and stored in the memory circuit (13), and the vehicle total mass ($m_{total}$), which serves for the determination of the simulation mass ($m_{V\text{-}sim}$), is calculated with the aid of the translatory vehicle mass ($m_V$).

6. Apparatus according to claim 5, characterized in that the evaluating device (10) is connected with a test input device (11) into which the velocity values ($\Delta v$) per time ($\Delta t$) are input and therefrom the values for the braking ($-a$) of the vehicle are calculated in connection with so-called roll-out tests of a vehicle (5) on the street, from which driving resistance characteristic values are formed by the evaluating device (10) with the aid of the measured vehicle masses ($m_{wheel\text{-}F}$, $m_{wheel\text{-}R}$), wherein the vehicle resistance characteristic values serve for the determination of the simulation mass ($m_{V\text{-}sim}$).

7. Apparatus according to claim 5, characterized in that values of a resistance characteristic curve (DRC) with estimated total mass values ($m_{estimated}$) are input into the evaluating device (10), and are set into a ratio with measured vehicle total mass values ($m_{total}$) in the evaluating device (10), from which the evaluating device (10) forms values ($F_{DRC}$) or a corrected driving resistance characteristic curve (DRC).

8. Apparatus according to claim 5, characterized in that the evaluating device (10), the memory circuit (13) and the test input device (11) are embodied as an electronic circuit.

9. Apparatus according to claim 5, characterized in that the evaluating device (10), the memory circuit (13) and/or the test input device (11) are embodied as a program controlled computer circuit.

* * * * *

UNITED STATES PATENT AND TRADEMARK OFFICE
CERTIFICATE OF CORRECTION

PATENT NO. : 6,516,287 B1
DATED : February 4, 2003
INVENTOR(S) : Freitag

It is certified that error appears in the above-identified patent and that said Letters Patent is hereby corrected as shown below:

Title page,
Item [57], ABSTRACT,
Delete and replace the ABSTRACT to read as follows:
-- In a method and an apparatus for the mass simulation of vehicle massses on a stationary roller test stand, the simulation mass ($m_{sim}$) is determined from the test stand mass ($m_T$) and from the mass ($m_{wheel-F}$) of the non-driven rotatable vehicle parts that are determined by measuring techniques, as well as from the mass ($m_{wheel-R}$) of the driven rotatable vehicle parts that are determined by measuring techniques, and with the aid of the translatory vehicle mass ($m_V$), in and evaluating device (10) of the test stand. --;

Column 1,
Line 4, after the Title, insert -- FIELD OF THE INVENTION --;
Line 6, after "stands", delete "according to the";
Line 7, delete "preamble of the patent claim 1";
Line 8, after "method", delete "according to the preamble of the --;
Line 9, delete "patent claim 5";
Between Lines 9 and 10, insert -- BACKGROUND OF THE INFORMATION --;
Between Lines 58 and 59, insert -- SUMMARY OF THE INVENTION --;
Line 59, delete and replace "Therefore" by -- In view of the above --;
Lines 62 to 65, delete the following text:
"This object has been achieved by the invention defined in the patent claims 1 and 5. Further developments and advantageous example embodiments of the invention are defined in the dependent claims."

UNITED STATES PATENT AND TRADEMARK OFFICE
CERTIFICATE OF CORRECTION

PATENT NO. : 6,516,287 B1
DATED : February 4, 2003
INVENTOR(S) : Freitag

It is certified that error appears in the above-identified patent and that said Letters Patent is hereby corrected as shown below:

Column 1 cont'd,
Line 62, insert the following text:

-- The above object has been achieved according to the invention in a method for the mass simulation of vehicle masses on stationary test stands, especially on vehicle roller test stands, whereby the simulation mass is determined from the vehicle masses rotating along on the test stand and the remaining vehicle masses, characterized in that a separate testing process is carried out on the test stand for the remaining rotatable vehicle parts, and the vehicle total mass ($m_{total}$), which serves for the determination of the simulation mass ($m_{v-sim}$), is determined from the measured values ($m_{wheel-F}$) of the separate testing process and with the aid of the translatory vehicle mass ($m_v$) as well as the vehicle masses ($m_{wheel-R}$) rotating along during the testing process.

The above object has further been achieved according to the invention in an apparatus for carrying out the inventive method, wherein the regulating circuit (9) of a stationary test stand contains an evaluating device (10) with a memory circuit (13), which are so embodied, so that in a testing process without vehicle loading, the test stand mass ($m_T$) or the test stand losses ($F_{1T}$) are determined by means of the evaluating device (10) and stored in the memory circuit (13), as well as in a further testing process the rotatable non-driven vehicle masses ($m_{wheel-F}$) and in a further separate testing process the driven rotatable vehicle masses ($m_{wheel-R}$) are determined by means of a measuring process by the evaluating device (10) and stored in the memory circuit (13), and the vehicle total mass ($m_{total}$), which serves for the determination of the simulation mass ($m_{v-sim}$), is calculated with the aid of the translatory vehicle mass ($m_v$). --;

UNITED STATES PATENT AND TRADEMARK OFFICE
CERTIFICATE OF CORRECTION

PATENT NO. : 6,516,287 B1  
DATED : February 4, 2003  
INVENTOR(S) : Freitag

It is certified that error appears in the above-identified patent and that said Letters Patent is hereby corrected as shown below:

Column 2,
Following Line 3, insert -- BRIEF DESCRIPTION OF THE DRAWING --;
Line 4, after "invention", replace "is" by -- will be --;
Line 5, after "in the", insert -- accompanying single --;
Line 6, replace "drawing. The drawing shows" by -- drawing figure. The single drawing figure shows --;
Line 8, after "loop", insert the following text:
   -- according to the invention, for carrying out the method according to the invention.

DETAILED DESCRIPTION OF THE INVENTION

The drawing shows a roller test stand with a regulating circuit or closed loop control --;
Line 31, after "12, the", replace "force" by -- torque --;
Line 42, after "mass", replace "$m_F$" by -- $m_V$ --;
Line 46, after "stand mass", replace "$m_p$" by -- $m_T$ --;
Line 47, after "masses", replace "$m_{Rad\ h}$" by -- $m_{wheel\text{-}R}$ --;
Line 48, after "mass", replace "$m_{Rad\ v}$" by -- $m_{wheel\text{-}F}$ --;
Line 52, after "5" replace "as" by -- (as --;
Line 53, before "drives", replace "sample" by -- sample) --;

Column 3,
Line 3, after "stand mass", replace "$m_p$" by -- $m_T$ --;
Line 3, after "the mass", replace "$m_{Rad\ h}$" by -- $m_{wheel\text{-}R}$ --;
Line 4, after "mass", replace "$m_{Rad\ v}$" by -- $m_{wheel\text{-}F}$ --;
Lines 16, 17 and 21, after "mass", replace "$m_{gesamt}$" by -- $m_{total}$ --;
Line 22, after "calculated", replace "to" by -- as --;
Line 23, replace "$m_{gesamt}=m_F m_{Rad\ v}+m_{Rad\ h}$" by -- $m_{total} = m_V + m_{wheel\text{-}F} + m_{wheel\text{-}R}$ --;
Line 25, replace "$m_F$" by -- $m_V$ --;
Line 26, replace "$m_{Rad\ v}$" by -- $m_{wheel\text{-}F}$ --;
Line 27, replace "$m_{Rad\ h}$" by -- $m_{wheel\text{-}R}$ --;
Line 28, after "mass", replace "$m_{F\ sim}$" by -- $m_{V\text{-}sim}$ --;
Line 30, after "rear drive", replace "$m_{Rad\ h}$" by -- $m_{wheel\text{-}R}$ --;
Line 32, after "mass", replace "$m_{gesamt}$" by -- $m_{total}$ --;
Line 35, replace "$m_{F\ sim}=m_{gesamt} - m_{Rad\ h}= m_F+m_{Rad\ v}$" by -- $m_{V\text{-}sim} = m_{total} - m_{wheel\text{-}R} = m_V + m_{wheel\text{-}F}$. --;

UNITED STATES PATENT AND TRADEMARK OFFICE
CERTIFICATE OF CORRECTION

PATENT NO. : 6,516,287 B1
DATED : February 4, 2003
INVENTOR(S) : Freitag

It is certified that error appears in the above-identified patent and that said Letters Patent is hereby corrected as shown below:

Column 3 cont'd,
Line 36, after "mass", replace "$m_F$" by -- $m_V$ --;
Lines 40 and 47, after "mass", replace "$m_p$" by -- $m_T$ --;
Line 48, after "mass", replace "$m_{Rad\ v}$" by -- $m_{wheel-F}$ --;
Line 48, after "losses", replace "$F_{V\ Rad\ v}$" by -- $F_{L-wheel-F}$ --;
Line 59, after "mass", replace "$m_{Rad\ h}$" by -- $m_{wheel-R}$ --;
Line 60, before "are given", replace "$F_{V\ Rad\ h}$" by -- $F_{L-wheel-R}$ --;
Line 65, after "mass", replace "$m_{gesamt}$" by -- $m_{total}$ --;

Column 4,
Line 2, after "mass", replace "$m_{F\ sim}$" by -- $m_{V-sim}$ --;
Line 5, replace "$m_{F\ sim} = m_{gesamt} - m_{Rad\ h} = m_F + m_{Rad\ v}$" by -- $m_{V-sim} = m_{total} - m_{wheel-R} = m_V + m_{wheel-F}$ --.
Line 8, after "curve", replace "FWK" by -- DRC --;
Line 26, replace $$"F_{FWK} = -m_{gesamt} \cdot \frac{\Delta v}{\Delta t}" \text{ by } -- F_{DRC} = -m_{total} \cdot \frac{\Delta v}{\Delta t} --;$$

Line 29, after "forces", replace "$F_{FWK}$" by -- $F_{DRC}$ --;
Line 35, after "value", replace "$F_{ist}$" by -- $F_{actual}$ --;
Line 46, after "mass", replace "$m_{gesamt}$" by -- $m_{total}$ --;
Line 50, replace $$"F_{FWK} = \frac{m_{gesamt}}{m_{geschätzt}} \times \frac{\Delta v}{\Delta t} \times m_{geschätzt} = \frac{m_{gesamt}}{m_{geschätzt}} \times F_{FWKgeschätzt}" \text{ by}$$

$$-- F_{DRC} = \frac{m_{total}}{m_{estimated}} \times \frac{\Delta v}{\Delta t} \times m_{estimated} = \frac{m_{total}}{m_{estimated}} \times F_{DRCestimated} --;$$

Line 54, replace "FWK" by -- DRC --.

Signed and Sealed this

First Day of July, 2003

JAMES E. ROGAN
*Director of the United States Patent and Trademark Office*